United States Patent [19]
Thom, Jr. et al.

[11] Patent Number: 5,582,482
[45] Date of Patent: Dec. 10, 1996

[54] PILLOW BLOCK BEARING

[75] Inventors: Kelsey C. Thom, Jr., Cedar Falls; William S. Olson, Evansdale, both of Iowa

[73] Assignee: California Pellet Mill Company, Nashua, N.H.

[21] Appl. No.: 441,148

[22] Filed: May 15, 1995

[51] Int. Cl.$^6$ .............................. F16C 35/00; F16C 23/08
[52] U.S. Cl. ........................ 384/434; 384/538; 384/558; 384/585
[58] Field of Search ................................ 384/295, 296, 384/418, 428, 434, 538, 540, 546, 549, 558, 562, 568, 584, 585, 459, 441

[56] References Cited

U.S. PATENT DOCUMENTS

| | | | |
|---|---|---|---|
| 1,877,206 | 9/1932 | Strong | 384/558 |
| 1,904,258 | 4/1933 | Wistrand | 384/558 |
| 1,986,027 | 1/1935 | Talbot | 384/418 X |
| 2,033,156 | 3/1936 | Shafer | 384/584 |
| 3,957,319 | 5/1976 | Gorski | 384/568 X |
| 3,989,323 | 11/1976 | Lambert | 384/434 |

Primary Examiner—Thomas R. Hannon
Attorney, Agent, or Firm—Michael H. Minns

[57] ABSTRACT

A split housing pillow block bearing assembly for use with a roll having a shaft. A bearing assembly including a bearing housing split along a parting line passing through the axis of the shaft into an upper housing and a lower housing, the lower housing having a foot portion extending therefrom, the foot portion being offset towards the roll whereby a portion of the bearing housing projects axially outward from the foot portion away from the roll, the lower housing and the upper housing each having an arcuate bearing receiving aperture; a spherical roller bearing positioned within the arcuate bearing receiving apertures, the spherical roller bearing having a inner bore extending therethrough, the inner bore being tapered; and a tapered sleeve mounted on the shaft, the tapered sleeve being received within the bearing inner bore, the foot portion of the bearing being attached to the frame.

8 Claims, 3 Drawing Sheets

PILLOW BLOCK BEARING

BACKGROUND OF THE INVENTION

This invention relates generally to bearings and more particularly to pillow block bearings for use with roll mills.

Typically, roll mills are rotatably supported by a pair of bearings. The roll shaft is commonly fastened to the bearings by use of set screws on the inner race of the bearings. The use of set screws has not been a satisfactory means of securing the shaft to the bearings. Inadequate securing of the shaft to the bearing can cause shaft failure.

The foregoing illustrates limitations known to exist in present roll mill bearings. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing in combination: a roll having a shaft, the shaft extending from the ends of the roll; a frame; a pair of bearing assemblies mounted to the frame rotatably supporting the shaft ends, each bearing assembly comprising: a bearing housing split along a parting line into an upper housing and a lower housing, and a bearing positioned within the bearing housings, the bearing having an inner bore extending therethrough, a shaft end being positioned within the bearing inner bore.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
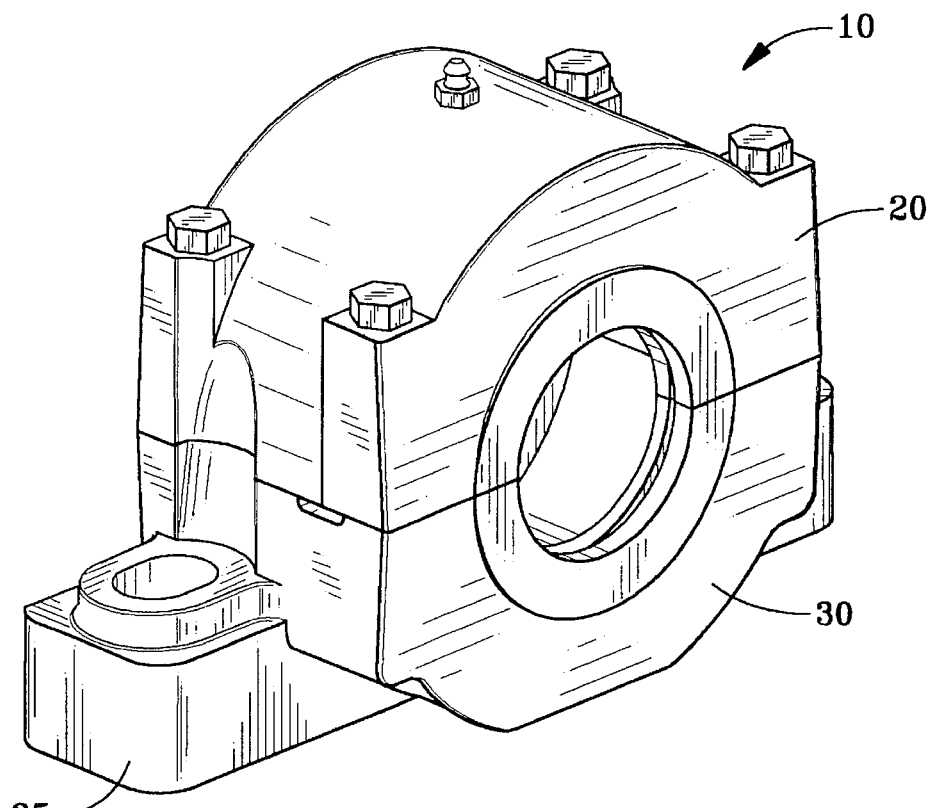
FIG. 1 is a perspective view of a split housing pillow block bearing housing of the present invention.
Figure 2:
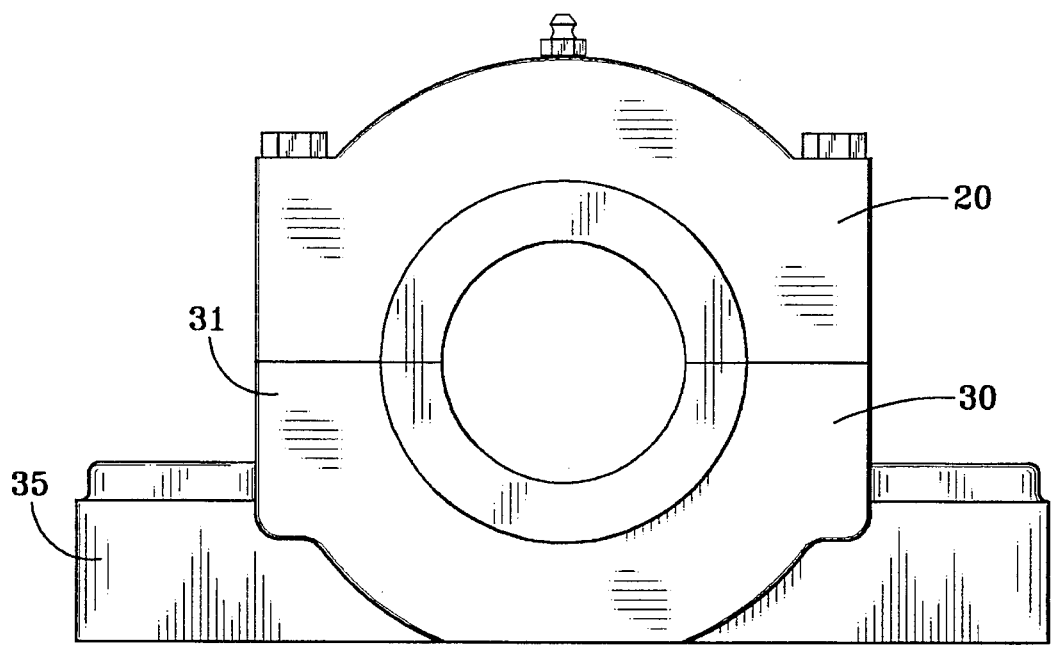
FIG. 2 is a front view of the split housing pillow block bearing housing shown in FIG. 1.
Figure 3:
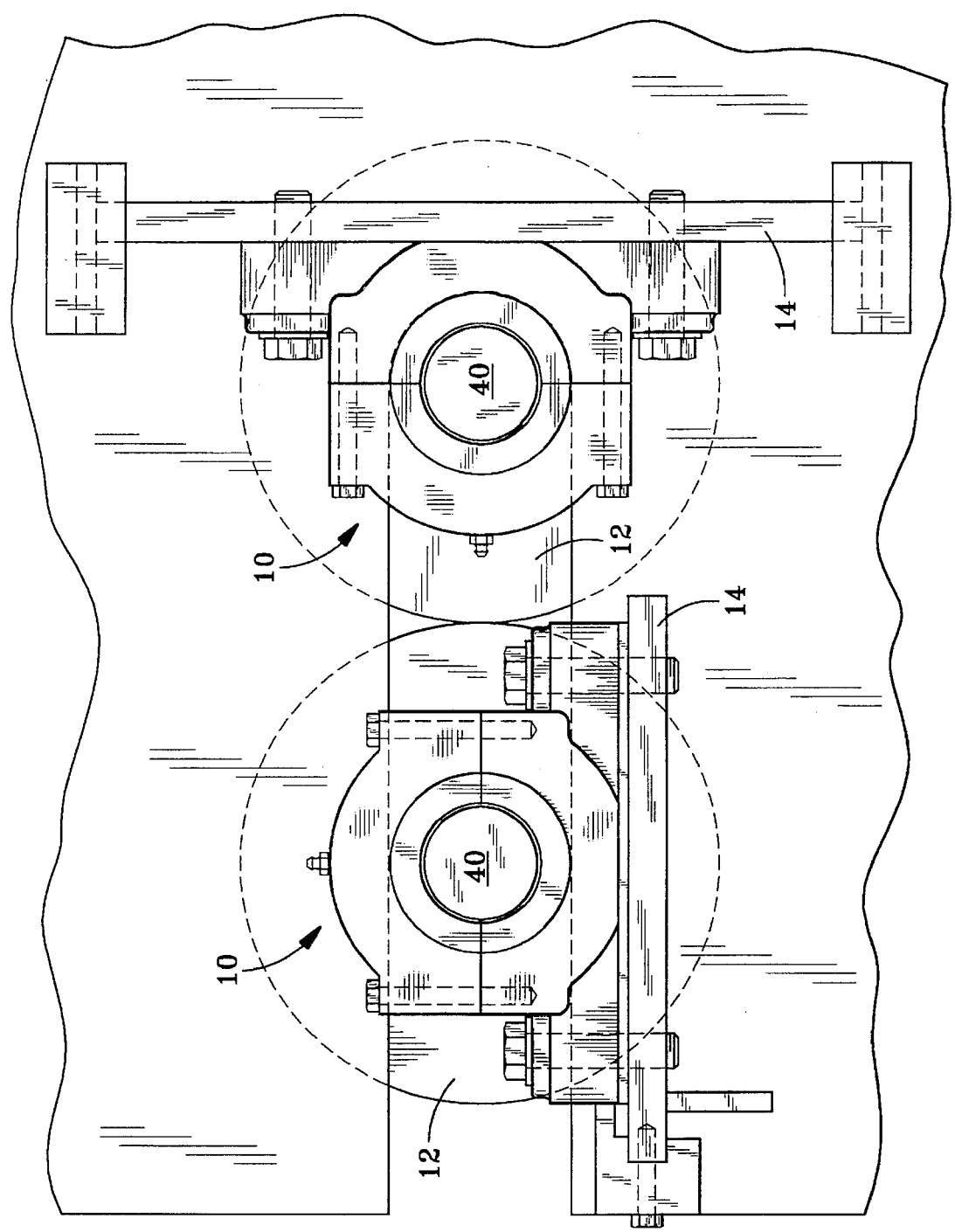
FIG. 3 is a schematic end view showing the arrangement of two split housing pillow block bearing housings and the associated rolls.
Figure 4:
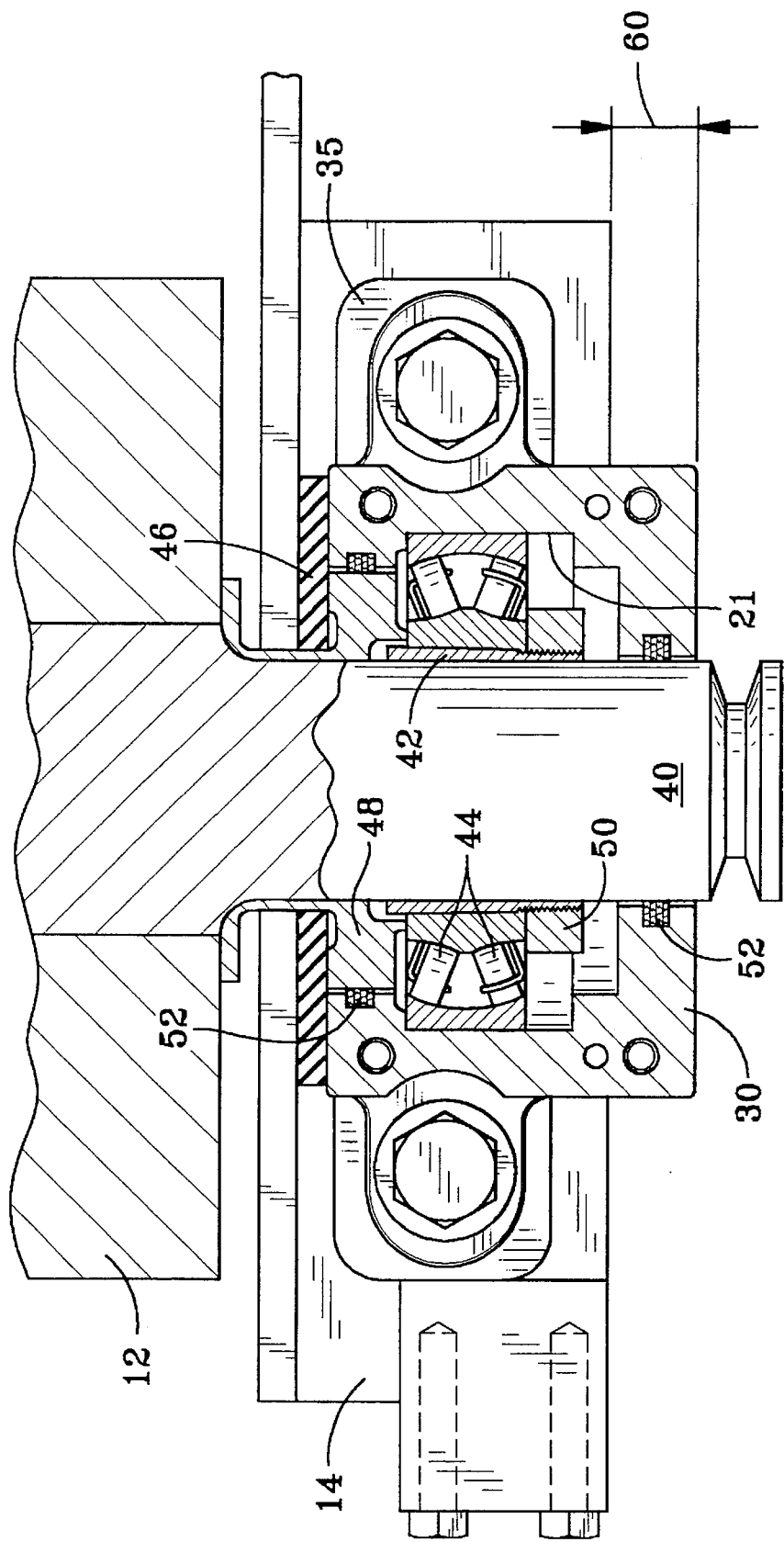
FIG. 4 is a cross-sectional plan view of the lower portion of a split housing pillow bearing housing and an associated roll.

FIGS. 1 and 2 show a split housing bearing assembly 10 according to the present invention. A portion of roll mill, shown in FIG. 3, illustrates the mounting of two bearing assemblies 10 to portions of a roll mill frame 14. In the preferred embodiment, one bearing assembly 10 is mounted to a horizontal portion of frame 14 and the other bearing assembly 10 is mounted to a vertical portion of frame 14. Rolls 12 with shafts 40 are rotatably secured to the bearing assemblies 10, preferably, one of the bearing assemblies 10 is adjustably mounted to frame 14 to allow for adjustment of one roll 12 relative to the other roll 12. For the embodiment shown in FIG. 3, the vertical frame portion 14 is adjustable.

Each bearing assembly 10 includes an upper housing 20 and a lower housing 30 which separate on a parting line which passes through the axis of shaft 40. The lower housing 30 contains body portion 31 and a footer portion 35 which is fastened to frame 14. As shown in the FIGURES, the footer portion 35 is offset to one face of the bearing assembly 10. The bearing assemblies 10 are installed such that footer portion 35 is adjacent the roll 12 and a portion 60 of the bearing assembly 10 is overhung. The upper and lower housings 20, 30, each have a bearing receiving cavity 21 or acurate bearing receiving aperture. Within cavity 21 are positioned a positioning sleeve 48, a spherical roller bearing 44 and a retaining nut 50. The inner diameter or bore of the spherical roller bearing 44 is tapered from a larger diameter towards the roll 12 to a smaller diameter distal the roll 12. The portion of shaft 40 positioned within the bore of the spherical roller bearing 44 has a complementary taper to the bore of the bearing 44. preferably, a tapered sleeve 42 is positioned about the shaft 40. The outboard end of the tapered sleeve 42 is threaded to accept nut 50.

During assembly, the lower housing 30 is secured to frame 14. Roll 12 and shaft 40 with the tapered sleeve 42 and positioning sleeve 48 and bearing 44 positioned about the tapered sleeve 42 are moved into the roll mill housing with the bearing 44 being moved into cavity 21. Since the positioning sleeve 48 properly positions the bearing 44, nut 50 is threaded onto the threaded portion of tapered sleeve 42 and tightened prior to moving the roll 12 and shaft 40 with bearing 44 into cavity 21. As nut 50 is tightened, the tapered sleeve 42 is drawn into the bore of bearing 44. The complementary tapers of the bearing bore and the sleeve 42 tighten and secure shaft 40 to the bearing 44. The upper housing 20 is then attached to lower housing 30.

Various seals, such as foam seal 46 and felt seals 52, are used to seal the housing in which the rolls 12 are positioned and to seal the bearing housings 20, 30.

The tapered sleeve 42 is used to provide a tight fit within the bearing 44. A tight fit reduces the possibility of shaft failure. The offset foot portion 35 reduces the overhung load on the roll shaft 40.

Having described the invention, what is claimed is:

1. In combination:

a roll having a shaft, the shaft extending from the ends of the roll;

a frame;

a pair of bearing assemblies mounted to the frame rotatably supporting the shaft ends, each bearing assembly comprising: a bearing housing split along a parting line into an upper housing and a lower housing, the lower housing having a foot portion extending therefrom, the foot portion being offset towards the roll whereby a portion of the bearing housing projects axially outward from the foot portion away from the roll, and a bearing positioned within the bearing housings, the bearing having an inner bore extending therethrough, a shaft end being positioned within the bearing inner bore.

2. The combination according to claim 1, wherein the bearing is a spherical roller bearing.

3. The combination according to claim 1, wherein the shaft end is secured to the bearing inner bore.

4. In combination:

a roll having a shaft, the shaft extending from the ends of the roll;

a frame;

a pair of bearings mounted to the frame rotatably supporting the shaft ends, each bearing comprising: an upper housing; a lower housing, the lower housing having a foot portion extending therefrom, the foot portion being offset towards the roll whereby a portion of the upper and lower housings project axially outward from the foot portion away from the roll, the lower housing and the upper housing each having an arcuate bearing receiving aperture; and a bearing positioned within the arcuate bearing receiving apertures, the bearing having an inner bore extending therethrough, the inner bore being tapered, the shaft having a tapered sleeve thereon, the tapered sleeve having a shape complementary to the bearing inner bore, the tapered sleeve being received within the bearing inner bore, the foot portion of the lower housing being attached to the frame.

5. The combination according to claim 4, wherein the end of the shaft is threaded, and further comprising: a nut engaging the shaft end threads.

6. In combination:

a roll having a shaft, the shaft extending from the ends of the roll;

a frame;

a pair of bearings mounted to the frame rotatably supporting the shaft ends, each bearing comprising: a bearing housing split along a parting line passing through the axis of the shaft into an upper housing and a lower housing, the lower housing having a foot portion extending therefrom, the foot portion being offset towards the roll whereby a portion of the bearing housing projects axially outward from the foot portion away from the roll, the lower housing and the upper housing each having an arcuate bearing receiving aperture; a spherical roller bearing positioned within the arcuate bearing receiving apertures, the spherical roller bearing having a inner bore extending therethrough, the inner bore being tapered; and a tapered sleeve mounted on the shaft, the tapered sleeve being received within the bearing inner bore, the foot portion of the bearing being attached to the frame.

7. A bearing assembly comprising:

an upper housing having an arcuate bearing receiving aperture;

a lower housing having a body portion with an arcuate bearing receiving aperture and a foot portion extending from the body portion, the foot portion being axially offset from the body portion whereby a portion of the upper and lower housings project axially outward from the foot portion; and a bearing positioned within the arcuate bearing receiving apertures.

8. The bearing assembly according to claim 7, wherein the bearing is a spherical roller bearing.

\* \* \* \* \*